US012659459B2

(12) United States Patent
Lee

(10) Patent No.: US 12,659,459 B2
(45) Date of Patent: *Jun. 16, 2026

(54) METHOD AND APPARATUS FOR INTER PREDICTION IN VIDEO PROCESSING SYSTEM

(71) Applicant: LG ELECTRONICS INC., Seoul (KR)

(72) Inventor: Jaeho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 6 days.

This patent is subject to a terminal disclaimer.

(21) Appl. No.: 18/785,438

(22) Filed: Jul. 26, 2024

(65) Prior Publication Data

US 2024/0388696 A1 Nov. 21, 2024

Related U.S. Application Data

(63) Continuation of application No. 18/104,477, filed on Feb. 1, 2023, now Pat. No. 12,081,738, which is a continuation of application No. 17/373,153, filed on Jul. 12, 2021, now Pat. No. 11,601,643, which is a continuation of application No. 17/069,486, filed on Oct. 13, 2020, now Pat. No. 11,102,478, which is a continuation of application No. PCT/KR2019/004334, filed on Apr. 11, 2019.

(60) Provisional application No. 62/657,013, filed on Apr. 13, 2018.

(51) Int. Cl.
*H04N 19/105* (2014.01)
*H04N 19/137* (2014.01)
*H04N 19/159* (2014.01)
*H04N 19/176* (2014.01)

(52) U.S. Cl.
CPC ......... *H04N 19/105* (2014.11); *H04N 19/137* (2014.11); *H04N 19/159* (2014.11); *H04N 19/176* (2014.11)

(58) Field of Classification Search
CPC ........................... H04N 19/105; H04N 19/137
See application file for complete search history.

(56) References Cited

U.S. PATENT DOCUMENTS

| | | | | |
|---|---|---|---|---|
| 10,516,894 B2* | 12/2019 | Takahashi | ............ | H04N 19/513 |
| 2013/0003849 A1* | 1/2013 | Chien | ................. | H04N 19/517 |
| | | | | 375/E7.113 |
| 2013/0039423 A1* | 2/2013 | Helle | ..................... | H04N 19/46 |
| | | | | 375/E7.125 |

(Continued)

*Primary Examiner* — Irfan Habib

(74) *Attorney, Agent, or Firm* — Bryan Cave Leighton Paisner LLP

(57) ABSTRACT

Disclosed is an inter prediction method which includes deriving control points (CPs) for the current block, wherein the CPs include a first CP and a second CP, deriving a first motion vector predictor (MVP) for the first CP and a second MVP for the second CP based on neighboring blocks of the current block, decoding a first motion vector difference (MVD) for the first CP, decoding a difference of two MVDs (DMVD) for the second CP, deriving a first motion vector (MV) for the first CP based on the first MVP and the first MVD, deriving a second MV for the second CP based on the second MVP and the DMVD for the second CP, and generating a predicted block for the current block based on the first MV and the second MV.

4 Claims, 12 Drawing Sheets

(56) References Cited

U.S. PATENT DOCUMENTS

| | | | |
|---|---|---|---|
| 2014/0241434 A1* | 8/2014 | Lin | H04N 19/597 |
| | | | 375/240.16 |
| 2015/0195562 A1* | 7/2015 | Li | H04N 19/109 |
| | | | 375/240.16 |
| 2016/0337662 A1* | 11/2016 | Pang | H04N 19/523 |
| 2018/0192071 A1* | 7/2018 | Chuang | H04N 19/52 |
| 2018/0220149 A1* | 8/2018 | Son | H04N 19/182 |
| 2019/0082192 A1* | 3/2019 | Chuang | H04N 19/44 |
| 2019/0089974 A1* | 3/2019 | Lee | H04N 19/176 |
| 2019/0110064 A1* | 4/2019 | Zhang | H04N 19/184 |
| 2019/0116376 A1* | 4/2019 | Chen | H04N 19/70 |
| 2019/0230361 A1* | 7/2019 | Zhang | H04N 19/537 |
| 2020/0404254 A1* | 12/2020 | Zhao | H04N 19/70 |

* cited by examiner

Translate          Scale

Rotate          Shear

CURRENT BLOCK

METHOD AND APPARATUS FOR INTER PREDICTION IN VIDEO PROCESSING SYSTEM

CROSS-REFERENCE TO RELATED APPLICATION

This application is a Continuation of U.S. patent application Ser. No. 18/104,477, filed Feb. 1, 2023, which is a Continuation of U.S. patent application Ser. No. 17/373,153, filed Jul. 12, 2021, now U.S. Pat. No. 11,601,643, issued Mar. 7, 2023, which is a Continuation of U.S. patent application Ser. No. 17/069,486, filed Oct. 13, 2020, now U.S. Pat. No. 11,102,478, issued Aug. 24, 2021, which is a Continuation of National Stage filing under 35 U.S.C. of International Application No. PCT/KR2019/004334, filed on Apr. 11, 2019, which claims the benefit of U.S. Provisional Application No. 62/657,013, filed on Apr. 13, 2018, the contents of which are all hereby incorporated by reference herein in their entirety.

BACKGROUND OF THE DISCLOSURE

Field of the disclosure

The present disclosure relates generally to a video coding technology, and more particularly, to an inter prediction method and apparatus in a video processing system.

Related Art

Demands for high-resolution and high-quality images, such as High Definition (HD) images and Ultra High Definition (UHD) images, are increasing in various fields. As image data has high resolution and high quality, the amount of information or bits to be transmitted increases relative to legacy image data. Accordingly, when image data is transmitted using a medium, such as a conventional wired/wireless broadband line, or image data is stored using an existing storage medium, a transmission cost and a storage cost thereof are increased.

Accordingly, there is a need for a highly efficient image compression technique for effectively transmitting, storing, and reproducing information of high resolution and high quality images.

SUMMARY

A technical objective of the present disclosure is to provide a method and apparatus which increase video coding efficiency.

Another technical objective of the present disclosure is to provide a method and apparatus for processing an image using affine motion prediction.

Still another technical objective of the present disclosure is to provide a method and apparatus which perform inter prediction based on a sample unit motion vector.

Still another technical objective of the present disclosure is to provide a method and apparatus for deriving a sample unit motion vector based on a motion vector for control points of a current block.

Still another technical objective of the present disclosure is to provide a method and apparatus for improving coding efficiency by using a difference between motion vector differences for control points of a current block.

Still another technical objective of the present disclosure is to provide a method and apparatus for deriving a motion vector predictor for another control point based on a motion vector predictor for a control point.

Still another technical problem of the present disclosure is to provide a method and apparatus for deriving a motion vector predictor for a control point based on a motion vector of a reference region adjacent to the control point.

An embodiment of the present disclosure provides an inter prediction method performed by a decoding apparatus. The inter prediction method includes deriving control points (CPs) for the current block, wherein the CPs include a first CP and a second CP, deriving a first motion vector predictor (MVP) for the first CP and a second MVP for the second CP based on neighboring blocks of the current block, decoding a first motion vector difference (MVD) for the first CP, decoding a difference of two MVDs (DMVD) for the second CP, deriving a first motion vector (MV) for the first CP based on the first MVP and the first MVD, deriving a second MV for the second CP based on the second MVP and the DMVD for the second CP, and generating a predicted block for the current block based on the first MV and the second MV, wherein the DMVD for the second CP represents a difference between the first MVD and the second MVD for the second CP.

According to another example of the present disclosure, there is provided a video encoding method which is performed by an encoding apparatus. The encoding method includes deriving control points (CPs) for the current block, wherein the CPs include a first CP and a second CP, deriving a first motion vector predictor (MVP) for the first CP and a second MVP for the second CP based on neighboring blocks of the current block, deriving a first motion vector difference (MVD) for the first CP, deriving a difference of two MVDs (DMVD) for the second CP, and encoding image information including information on the first MVD and information on the DMVD for the second CP to output a bitstream, wherein the DMVD for the second CP represents a difference between the first MVD and the second MVD for the second CP.

According to still another embodiment of the present disclosure, a decoding apparatus which performs an inter prediction method is provided. The decoding apparatus includes an entropy decoder which decodes a first motion vector difference (MVD) for a first CP and a difference of two MVDs (DMVD) for a second CP; and a predictor that derives control points (CPs) for the current block, which include a first CP and a second CP, derives a first motion vector predictor (MVP) for the first CP and a second MVP for the second CP based on neighboring blocks of the current block, derives a first motion vector (MV) for the first CP based on the first MVP and the first MVD, derives a second MV for the second CP based on the second MVP and the DMVD for the second CP, and generates a predicted block for the current block based on the first MV and the second MV, wherein the DMVD for the second CP represents a difference between the first MVD and the second MVD for the second CP.

According to still another embodiment of the present disclosure, there is provided an encoding apparatus that performs video encoding. The encoding apparatus includes a predictor which derives control points (CPs) for the current block, which include a first CP and a second CP, derives a first motion vector predictor (MVP) for the first CP and a second MVP for the second CP based on neighboring blocks of the current block, derives a first motion vector difference (MVD) for the first CP, and derives a difference of two MVDs (DMVD) for the second CP, and an entropy encoder which encodes image information including information on the first MVD and information on the DMVD for the second CP to output a bitstream, wherein the DMVD for the second CP represents a difference between the first MVD and the second MVD for the second CP.

According to the present disclosure, it is possible to derive more accurate sample unit motion vectors for a current block, and to significantly increase inter prediction efficiency.

According to the present disclosure, motion vectors for samples of a current block can be efficiently derived based on motion vectors of control points for the current block.

According to the present disclosure, it is possible to remove or reduce the amount of data for motion vectors of the control points by transmitting the difference between the motion vector differences and/or the motion vector differences of the control points for the current block, and overall coding efficiency can be improved.

BRIEF DESCRIPTION OF THE DRAWINGS

FIG. 1 is a block diagram schematically illustrating a video encoding apparatus according to an embodiment of the present disclosure.

FIG. 2 is a block diagram schematically illustrating a video decoding apparatus according to an embodiment of the present disclosure.

FIG. 3 illustratively represents a content streaming system according to an embodiment of the present disclosure.

DESCRIPTION OF EXEMPLARY EMBODIMENTS

Figure 4:
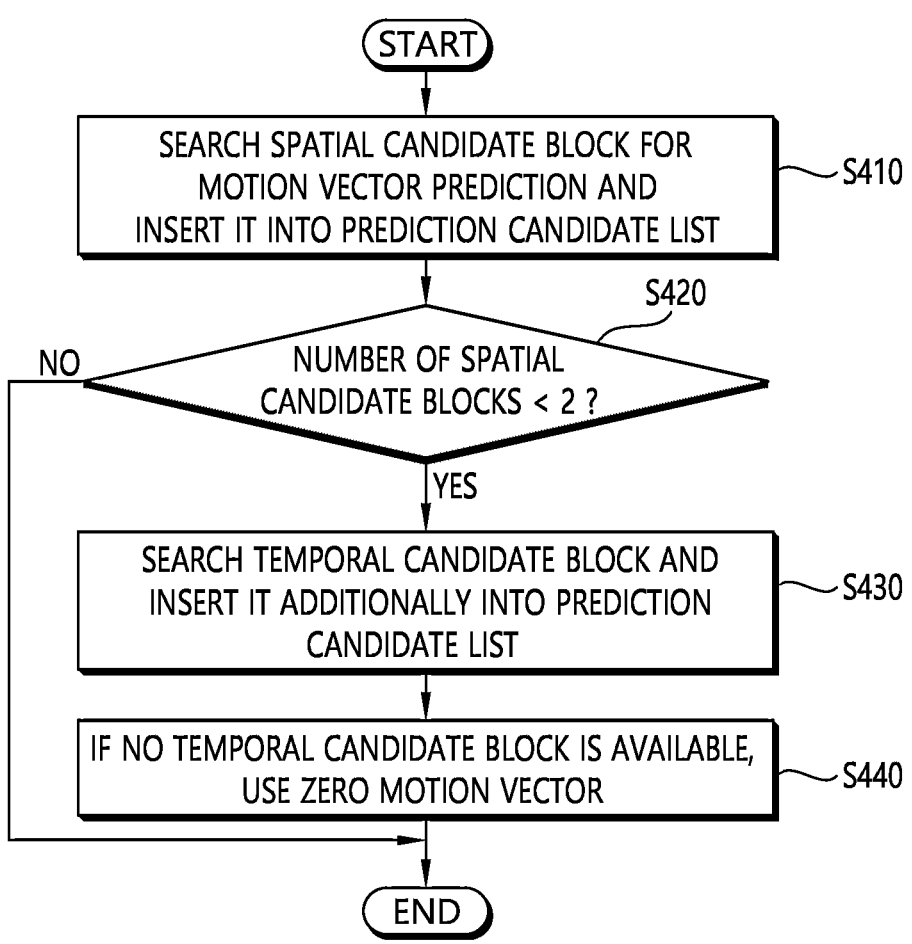
FIG. 4 is a flowchart for illustrating a method of deriving a motion vector prediction value from a neighboring block according to an embodiment of the present disclosure.

Although the present disclosure may be modified in various forms, specific embodiments thereof will be described in detail and illustrated in the drawings. However, this is not intended to limit the present disclosure to a specific embodiment. The terms used in the present specification are only used to describe specific embodiments, and are not intended to limit the technical idea of the present disclosure. The singular forms may include the plural forms unless the context clearly indicates otherwise. The terms such as "include (or comprise)", "have (or be provided with)", and the like are intended to indicate that features, numbers, steps, operations, components, parts, or combinations thereof written in the following description exist, and thus should not be understood as that the possibility of existence or addition of one or more different features, numbers, steps, operations, components, parts, or combinations thereof is excluded in advance.

Meanwhile, configurations in the drawings described in the disclosure are independently drawn in a video encoding apparatus/decoding apparatus for the purpose of convenience for explanation of different specific functions, but this does not mean that the configurations are embodied by independent hardware or independent software. For example, two or more configurations may be combined to form a single configuration, and one configuration may be divided into plural configurations. The embodiments in which the configurations are combined and/or the configuration is divided, also belong to the disclosure without departing from the concept of the disclosure.

In this disclosure, the term "/" and "," should be interpreted to indicate "and/or." For instance, the expression "A/B" may mean "A and/or B," and "A, B" may mean "A and/or B." Further, "A/B/C" may mean "at least one of A, B, and/or C." Also, "A, B, C" may mean "at least one of A, B, and/or C."

Further, in the disclosure, the term "or" should be interpreted to indicate "and/or." For instance, the expression "A or B" may comprise 1) only A, 2) only B, and/or 3) both A and B. In other words, the term "or" in this document may be interpreted to indicate "additionally or alternatively."

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

The following description may be applied in the technical field which deals with videos, images, or images. For example, a method or an exemplary embodiment disclosed in the following description may be associated with the disclosed contents of a Versatile Video Coding (VVC) standard (ITU-T Rec. H.266), a next-generation video/image coding standard after the VVC, or standards before the VVC (for example, a High Efficiency Video Coding (HEVC) standard (ITU-T Rec. H.265) or the like).

Hereinafter, examples of the present embodiment will be described in detail with reference to the accompanying drawings. In addition, like reference numerals are used to indicate like elements throughout the drawings, and the same descriptions on the like elements will be omitted.

In the present disclosure, a video may mean a set of a series of images according to a passage of time. Generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a "sample" may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information about the area. Optionally, the unit may be mixed with terms such as a block, an area, or the like. In a typical case, an M□N block may represent a set of samples or transform coefficients arranged in M columns and N rows.

Figure 1:
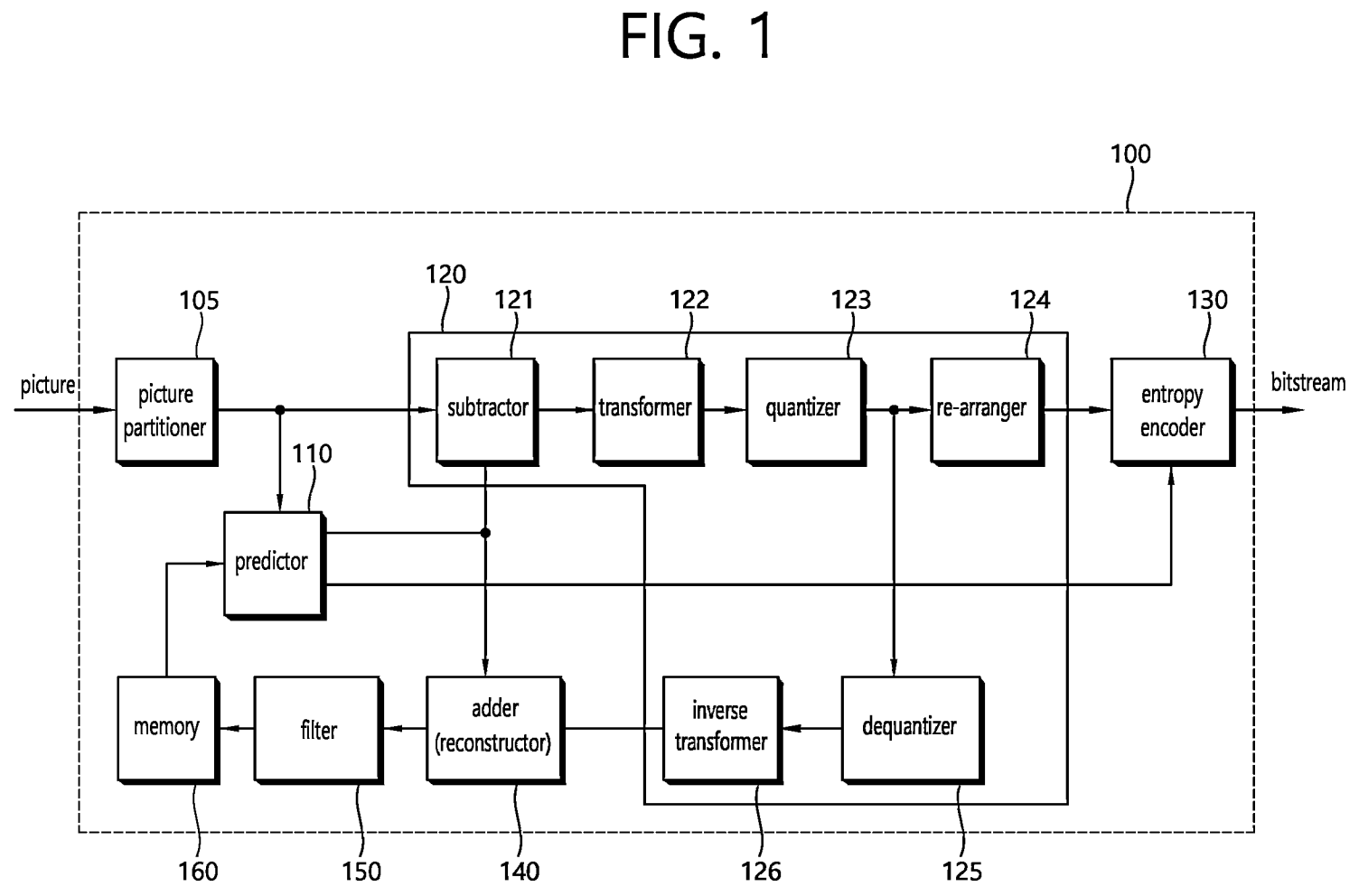

FIG. 1 is a block diagram briefly illustrating a structure of an encoding apparatus according an embodiment of the present disclosure. Hereinafter, an encoding/decoding apparatus may include a video encoding/decoding apparatus and/or an image encoding/decoding apparatus, and the video encoding/decoding apparatus may be used as a concept comprising the image encoding/decoding apparatus, or the image encoding/decoding apparatus may be used as a concept comprising the video encoding/decoding apparatus.

Referring to FIG. 1, a video encoding apparatus 100 may include a picture partitioner 105, a predictor 110, a residual processer 120, an entropy encoder 130, an adder 140, a filter 150, and a memory 160. The residual processer 120 may include a subtractor 121, a transformer 122, a quantizer 123, a re-arranger 124, a dequantizer 125, an inverse transformer 126.

The picture partitioner 105 may split an input picture into at least one processing unit.

In an example, the processing unit may be referred to as a coding unit (CU). In this case, the coding unit may be recursively split from the largest coding unit (LCU) according to a quad-tree binary-tree (QTBT) structure. For example, one coding unit may be split into a plurality of coding units of a deeper depth based on a quadtree structure, a binary tree structure and/or a ternary tree structure. In this case, for example, the quad tree structure may be first applied and the binary tree structure and ternary tree structure may be applied later. Alternatively, the binary tree structure/ternary tree structure may be applied first. The coding procedure according to the present embodiment may be performed based on a final coding unit which is not split any further. In this case, the largest coding unit may be used as the final coding unit based on coding efficiency, or the like, depending on image characteristics, or the coding unit may be recursively split into coding units of a lower depth as necessary and a coding unit having an optimal size may be used as the final coding unit. Here, the coding procedure may include a procedure such as prediction, transform, and reconstruction, which will be described later.

In another example, the processing unit may include a coding unit (CU) prediction unit (PU), or a transformer (TU). The coding unit may be split from the largest coding unit (LCU) into coding units of a deeper depth according to the quad tree structure. In this case, the largest coding unit may be directly used as the final coding unit based on the coding efficiency, or the like, depending on the image characteristics, or the coding unit may be recursively split into coding units of a deeper depth as necessary and a coding unit having an optimal size may be used as a final coding unit. When the smallest coding unit (SCU) is set, the coding unit may not be split into coding units less than the smallest coding unit. Here, the final coding unit refers to a coding unit which is partitioned or split to a prediction unit or a transformer. The prediction unit is a unit which is partitioned from a coding unit, and may be a unit of sample prediction. Here, the prediction unit may be divided into sub-blocks. The transformer may be divided from the coding unit according to the quad-tree structure and may be a unit for deriving a transform coefficient and/or a unit for deriving a residual signal from the transform coefficient. Hereinafter, the coding unit may be referred to as a coding block (CB), the prediction unit may be referred to as a prediction block (PB), and the transformer may be referred to as a transform block (TB). The prediction block or prediction unit may refer to a specific area in the form of a block in a picture and include an array of prediction samples. Also, the transform block or transformer may refer to a specific area in the form of a block in a picture and include the transform coefficient or an array of residual samples.

The predictor 110 may perform prediction on a processing target block (hereinafter, it may represent a current block or a residual block), and may generate a predicted block including prediction samples for the current block. A unit of prediction performed in the predictor 110 may be a coding block, or may be a transform block, or may be a prediction block.

The predictor 110 may determine whether intra-prediction is applied or inter-prediction is applied to the current block. For example, the predictor 110 may determine whether the intra-prediction or the inter-prediction is applied in unit of CU.

In case of the intra-prediction, the predictor 110 may derive a prediction sample for the current block based on a reference sample outside the current block in a picture to which the current block belongs (hereinafter, a current picture). In this case, the predictor 110 may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 110 may determine the prediction mode to be applied to the current block by using the prediction mode applied to the neighboring block.

In case of the inter-prediction, the predictor 110 may derive the prediction sample for the current block based on a sample specified by a motion vector on a reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bit stream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and may be discriminated from a coding order.

The subtractor 121 generates a residual sample which is a difference between an original sample and a prediction sample. If the skip mode is applied, the residual sample may not be generated as described above.

The transformer 122 transforms residual samples in units of a transform block to generate a transform coefficient. The transformer 122 may perform transform based on the size of a corresponding transform block and a prediction mode applied to a coding block or prediction block spatially overlapping with the transform block. For example, residual samples may be transformed using discrete sine transform (DST) transform kernel if intra-prediction is applied to the coding block or the prediction block overlapping with the transform block and the transform block is a 4×4 residual array and is transformed using discrete cosine transform (DCT) transform kernel in other cases.

The quantizer 123 may quantize the transform coefficients to generate quantized transform coefficients.

The re-arranger 124 rearranges quantized transform coefficients. The re-arranger 124 may rearrange the quantized transform coefficients in the form of a block into a one-dimensional vector through a coefficient scanning method. Although the re-arranger 124 is described as a separate component, the re-arranger 124 may be a part of the quantizer 123.

The entropy encoder 130 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 130 may perform encoding, according to an entropy encoding or according to a pre-configured method, together or separately on information (e.g., a syntax element value or the like) required for video reconstruction in addition to the quantized transform coefficients. The entropy-encoded information may be transmitted or stored in unit of a network abstraction layer (NAL) in a bit stream form. The bitstream may be transmitted via a network or be stored in a digital storage medium. Here, the network may include a broadcasting network or a communications network, the digital storage medium may include various storage medium such as USB, SD, CD, DVD, blue-ray, HDD, SDD and so on.

The dequantizer 125 dequantizes values (transform coefficients) quantized by the quantizer 123 and the inverse transformer 126 inversely transforms values dequantized by the dequantizer 125 to generate a residual sample.

The adder 140 adds a residual sample to a prediction sample to reconstruct a picture. The residual sample may be added to the prediction sample in units of a block to generate a reconstructed block. Although the adder 140 is described as a separate component, the adder 140 may be a part of the predictor 110. Meanwhile, the adder 140 may be referred to as a reconstructor or reconstructed block generator.

The filter 150 may apply deblocking filtering and/or a sample adaptive offset to the reconstructed picture. Artifacts at a block boundary in the reconstructed picture or distortion in quantization may be corrected through deblocking filtering and/or sample adaptive offset. Sample adaptive offset may be applied in units of a sample after deblocking filtering is completed. The filter 150 may apply an adaptive loop filter (ALF) to the reconstructed picture. The ALF may be applied to the reconstructed picture to which deblocking filtering and/or sample adaptive offset has been applied.

The memory 160 may store a reconstructed picture (decoded picture) or information necessary for encoding/decoding. Here, the reconstructed picture may be the reconstructed picture filtered by the filter 150. The stored reconstructed picture may be used as a reference picture for (inter) prediction of other pictures. For example, the memory 160 may store (reference) pictures used for inter-prediction. Here, pictures used for inter-prediction may be designated according to a reference picture set or a reference picture list.

Figure 2:
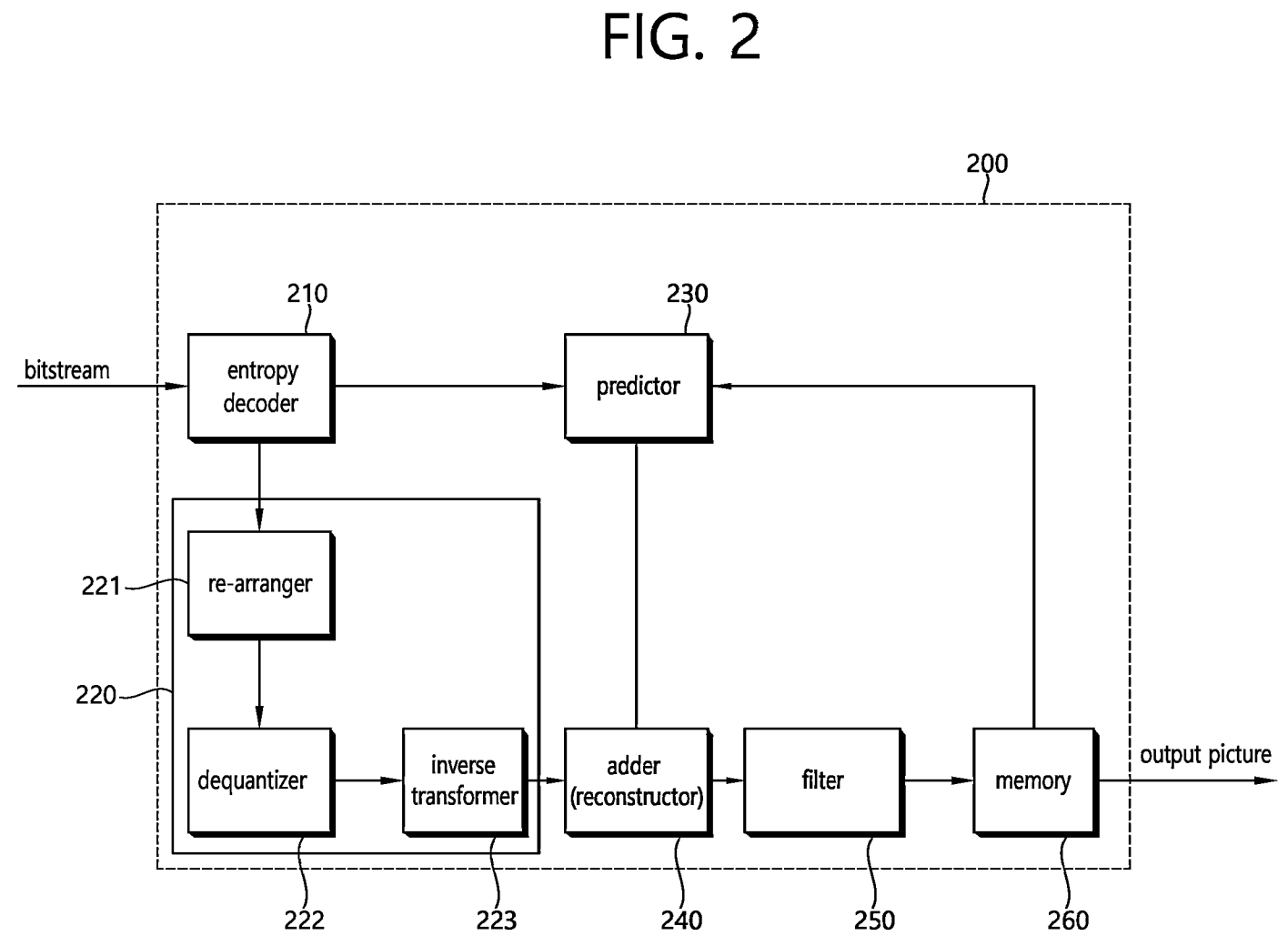

FIG. 2 is a block diagram briefly illustrating a structure of a video/image decoding apparatus according to an embodiment of the present disclosure.

Hereinafter, a video decoding apparatus may include an image decoding apparatus.

Referring to FIG. 2, a video decoding apparatus 200 may include an entropy decoder 210, a residual processer 220, a predictor 230, an adder 240, a filter 250, and a memory 260. The residual processer 220 may include a re-arranger 221, a dequantizer 222, an inverse transformer 223.

Further, although it is not depicted, the video decoding apparatus 200 may include a receiver for receiving a bitstream including video information. The receiver may be configured as a separate module or may be included in the entropy decoder 210.

When a bit stream including video/image information is input, the video decoding apparatus 200 may reconstruct a video/image/picture in association with a process by which video information is processed in the video encoding apparatus.

For example, the video decoding apparatus 200 may perform video decoding using a processing unit applied in the video encoding apparatus. Thus, the processing unit block of video decoding may be, for example, a coding unit and, in another example, a coding unit, a prediction unit or a transformer. The coding unit may be split from the largest coding unit according to the quad tree structure and/or the binary tree structure and/or ternary tree structure.

A prediction unit and a transformer may be further used in some cases, and in this case, the prediction block is a block derived or partitioned from the coding unit and may be a unit of sample prediction. Here, the prediction unit may be divided into sub-blocks. The transformer may be split from the coding unit according to the quad tree structure and may be a unit that derives a transform coefficient or a unit that derives a residual signal from the transform coefficient.

The entropy decoder 210 may parse the bit stream to output information required for video reconstruction or picture reconstruction. For example, the entropy decoder 210 may decode information in the bit stream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method may receive a bin corresponding to each syntax element in a bit stream, determine a context model using decoding target syntax element information and decoding information of neighboring and decoding target blocks or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model.

Information about prediction among information decoded in the entropy decoder 210 may be provided to the predictor 250 and residual values, that is, quantized transform coefficients, on which entropy decoding has been performed by the entropy decoder 210 may be input to the re-arranger 221.

The re-arranger 221 may rearrange the quantized transform coefficients into a two-dimensional block form. The re-arranger 221 may perform rearrangement corresponding to coefficient scanning performed by the encoding apparatus. Although the re-arranger 221 is described as a separate component, the re-arranger 221 may be a part of the dequantizer 222.

The dequantizer 222 may de-quantize the quantized transform coefficients based on a (de)quantization parameter to output a transform coefficient. In this case, information for deriving a quantization parameter may be signaled from the encoding apparatus.

The inverse transformer 223 may inverse-transform the transform coefficients to derive residual samples.

The predictor 230 may perform prediction on a current block, and may generate a predicted block including prediction samples for the current block. A unit of prediction performed in the predictor 230 may be a coding block or may be a transform block or may be a prediction block.

The predictor 230 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 230 may derive a prediction sample for a current block based on a neighboring reference sample in a current picture. The predictor 230 may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor 230 may derive a prediction sample for a current block based on a sample specified in a reference picture according to a motion vector. The predictor 230 may derive the prediction sample for the current block using one of the skip mode, the merge mode and the MVP mode. Here, motion information required for inter-prediction of the current block provided by the video encoding apparatus, for example, a motion vector and information about a reference picture index may be acquired or derived based on the information about prediction.

In the skip mode and the merge mode, motion information of a neighboring block may be used as motion information of the current block. Here, the neighboring block may include a spatial neighboring block and a temporal neighboring block.

The predictor 230 may construct a merge candidate list using motion information of available neighboring blocks and use information indicated by a merge index on the merge candidate list as a motion vector of the current block. The merge index may be signaled by the encoding apparatus. Motion information may include a motion vector and a reference picture. In the skip mode and the merge mode, a firstly-ordered picture in the reference picture list may be used as a reference picture when motion information of a temporal neighboring block is used.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list may be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the predictor 230 may derive the motion vector of the current block using the merge index.

When the MVP (Motion vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor 230 may select a prediction motion vector of the current block from the motion vector candidates included in the motion vector candidate list using the motion vector index. The predictor of the encoding apparatus may obtain a motion vector difference (MVD) between the motion vector of the current block and a motion vector predictor, encode the MVD and output the encoded MVD in the form of a bit stream. That is, the MVD may be obtained by subtracting the motion vector predictor from the motion vector of the current block. Here, the predictor 230 may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder 240 may add a residual sample to a prediction sample to reconstruct a current block or a current picture. The adder 240 may reconstruct the current picture by adding the residual sample to the prediction sample in units of a block. When the skip mode is applied, a residual is not transmitted and thus the prediction sample may become a reconstructed sample. Although the adder 240 is described as a separate component, the adder 240 may be a part of the predictor 230. Meanwhile, the adder 240 may be referred to as a reconstructor reconstructed block generator.

The filter 250 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 260 may store a reconstructed picture (decoded picture) or information necessary for decoding. Here, the reconstructed picture may be the reconstructed picture filtered by the filter 250. For example, the memory 260 may store pictures used for inter-prediction. Here, the pictures used for inter-prediction may be designated according to a reference picture set or a reference picture list. A reconstructed picture may be used as a reference picture for other pictures. The memory 260 may output reconstructed pictures in an output order.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter-prediction of a picture afterward, the encoding apparatus may also dequantize/inverse-transform the quantized transform coefficients to derive a residual block and generate a reconstructed picture based thereon.

Figure 3:
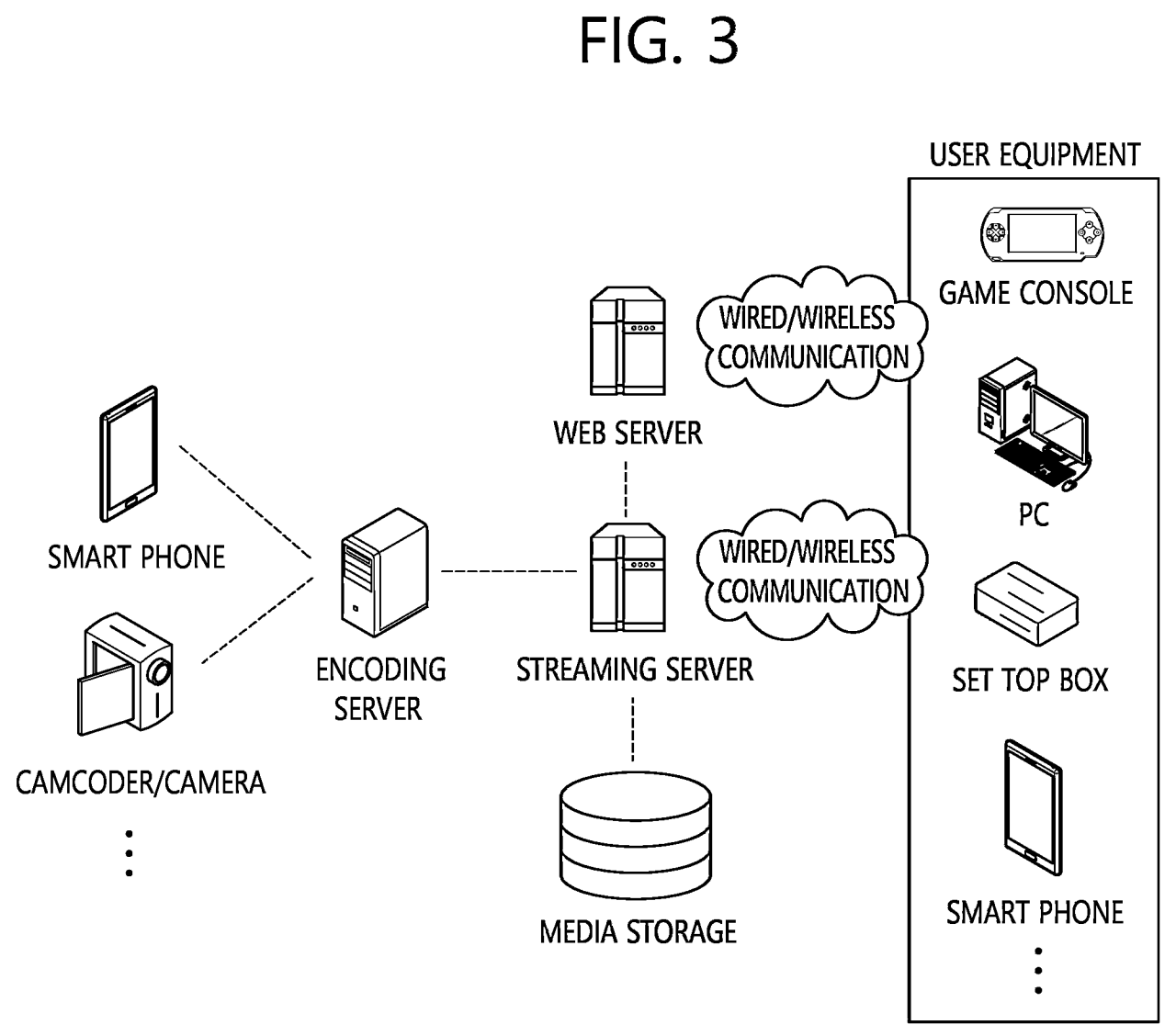

FIG. 3 illustratively represents a content streaming system according to an embodiment of the present disclosure.

Referring to FIG. 3, embodiments described in the present disclosure may be embodied and performed on a processor, a microprocessor, a controller or a chip. For example, function units shown in each drawing may be embodied and performed on a computer, a processor, a microprocessor, a controller or a chip. In this case, information (e.g., information on instructions) or algorithm for embodiment may be stored in a digital storage medium.

Further, the decoding apparatus and the encoding apparatus to which the present disclosure is applied, may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an over the top (OTT) video device, an Internet streaming service providing device, a three-dimensional (3D) video device, a video telephony video device, and a medical video device, and may be used to process a video signal or a data signal. For example, the over the top (OTT) video device may include a game console, a Blu-ray player, an Internet access TV, a Home theater system, a smartphone, a Tablet PC, a digital video recorder (DVR) and the like.

In addition, the processing method to which the present disclosure is applied, may be produced in the form of a program executed by a computer, and be stored in a computer-readable recording medium. Multimedia data having a data structure according to the present disclosure may also be stored in a computer-readable recording medium. The computer-readable recording medium includes all kinds of storage devices and distributed storage devices in which computer-readable data are stored. The computer-readable recording medium may include, for example, a Blu-ray Disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media embodied in the form of a carrier wave (for example, transmission over the Internet). In addition, a bitstream generated by the encoding method may be stored in a computer-readable recording medium or transmitted through a wired or wireless communication network.

Additionally, the embodiments of the present disclosure may be embodied as a computer program product by program codes, and the program codes may be executed on a computer by the embodiments of the present disclosure. The program codes may be stored on a computer-readable carrier.

The contents streaming system to which the present disclosure is applied may largely include an encoding server, a streaming server, a web server, a media storage, a user equipment, and a multimedia input device.

The encoding server functions to compress to digital data the contents input from the multimedia input devices, such as the smart phone, the camera, the camcoder and the like, to generate a bitstream, and to transmit it to the streaming server. As another example, in a case where the multimedia input device, such as, the smart phone, the camera, the camcoder or the like, directly generates a bitstream, the encoding server may be omitted.

The bitstream may be generated by an encoding method or a bitstream generation method to which the present disclosure is applied. And the streaming server may store the bitstream temporarily during a process to transmit or receive the bitstream.

The streaming server transmits multimedia data to the user equipment based on a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipments in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the contents streaming system may be operated as a distributed server, and in this case, data received by each server may be processed in distributed manner.

Hereinafter, the inter prediction method described with reference to FIGS. 1 and 2 will be described in detail.

FIG. 4 is a flowchart for illustrating a method of deriving a motion vector prediction value from a neighboring block according to an embodiment of the present disclosure.

In the case of the motion vector prediction (MVP) mode, the encoder predicts the motion vector according to the type of the prediction block, and transmits a difference value between the optimal motion vector and the prediction value to the decoder. In this case, the encoder transmits a motion vector difference value, neighboring block information, reference index and the like to the decoder. Here, the MVP mode may also be referred to as an advanced motion vector prediction (AMVP) mode.

The encoder may construct a prediction candidate list for motion vector prediction, and the prediction candidate list may include at least one of the spatial candidate block and the temporal candidate block.

First, the encoder may search a spatial candidate block for motion vector prediction, and insert it into the prediction candidate list (S410). To the process of constructing the spatial candidate block, a method of constructing a conventional spatial merge candidate in inter prediction according to a merge mode may be applied.

The encoder may check whether the number of the spatial candidate block is less than two (S420).

In a case where the number of the spatial candidate block is less than two as a result of the checking, the encoder may search a temporal candidate block and insert it into the prediction candidate list (S430). At this time, in a case where no temporal candidate block is available, the encoder may use a zero motion vector as a motion vector prediction value (S440). To the process of constructing the temporal candidate block, a method of constructing a conventional temporal merge candidate in inter prediction according to a merge mode may be applied.

On the other hand, in a case where the number of the spatial candidate blocks are equal to or greater than two as a result of the checking, the encoder may end constituting the prediction candidate list, and select the block from among the candidate blocks, which has a smallest cost. The encoder may determine the motion vector of the selected candidate block as a motion vector prediction value of the current block, and acquire the motion vector difference value by using the motion vector prediction value. The thus acquired motion vector difference value may be transmitted to the decoder.

Figure 5:
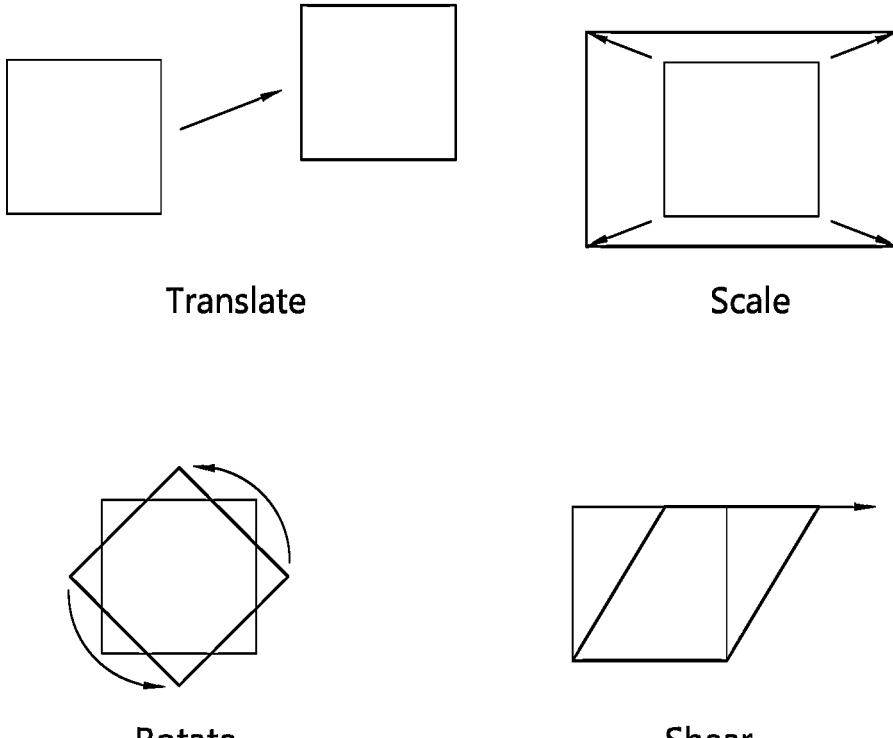
FIG. 5 illustratively represents an affine motion model according to an embodiment of the present disclosure.

FIG. 5 illustratively represents an affine motion model according to an embodiment of the present disclosure.

The affine mode may be one of various prediction modes in inter prediction, and the affine mode may also be referred to as an affine motion mode or a subblock motion prediction mode. The affine mode may refer to a mode in which the affine motion prediction method is performed using an affine motion model.

The affine motion prediction method may derive a motion vector of a sample unit by using two or more motion vectors in the current block. In other words, the affine motion prediction method may improve encoding efficiency by determining a motion vector not in a block unit but in a sample unit.

The general motion model may include a translation model, and motion estimation (ME) and motion compensation (MC) were performed based on the translation model efficient to represent a simple motion. However, the translation model may not be efficient to be applied to complex motions in natural video such as zoom-in, zoom-out, rotation, and other irregular motions. Accordingly, an embodiment of the present disclosure may use an affine motion model that can be efficiently applied to a complex motion.

Referring to FIG. 5, the affine motion model may include four motion models, but these are exemplary motion models, and the scope of the present disclosure is not limited thereto. The above-described four motions may include translation, scaling, rotation, and shearing. Here, the motion model for translation, scaling, and rotation may be referred to as a simplified affine motion model.

Figure 6:
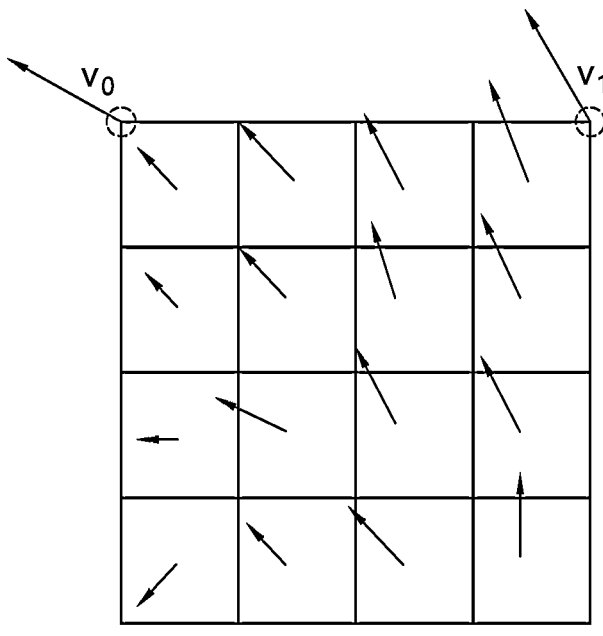
FIG. 6 illustratively represents a simplified affine motion model according to an embodiment of the present disclosure.

FIG. 6 illustratively represents a simplified affine motion model according to an embodiment of the present disclosure.

In the affine motion prediction, a control point (CP) may be defined to use the affine motion model, and it is possible to determine a motion vector of a subblock or a sample unit included in a block by using two or more control point motion vectors (CPMVs). Here, the set of motion vectors of a sample unit or a set of motion vectors of a subblock may be referred to as an affine motion vector field (affine MVF).

Referring to FIG. 6, the simplified affine motion model may mean a model for determining a motion vector of a sample unit or a subblock using CPMVs according to two CPs, and may also be referred to as a 4-parameter affine model. In FIG. 6, $v_0$ and $v_1$ may represent two CPMVs, and each arrow in a subblock may represent a motion vector of a subblock unit.

In other words, in the encoding/decoding process, the affine motion vector field may be determined in a sample unit or a subblock unit. Here, the sample unit may refer to a pixel unit, and the subblock unit may refer to an already defined block unit. When the affine motion vector field is determined in a sample unit, a motion vector may be obtained based on each pixel value, and in the case of a block unit, a motion vector of a corresponding block may be obtained based on a central pixel value of the block.

Figure 7:
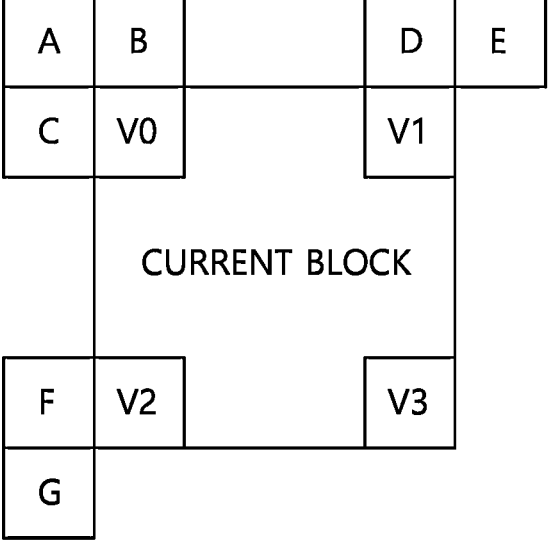
FIG. 7 is a diagram for describing a method of deriving a motion vector predictor at a control point according to an embodiment of the present disclosure.

FIG. 7 is a diagram for describing a method of deriving a motion vector predictor at a control point according to an embodiment of the present disclosure.

The affine mode may include an affine merge mode and an affine motion vector prediction (MVP) mode. The affine merge mode may be referred to as a subblock merge mode, and the affine MVP mode may be referred to as an affine inter mode.

In the affine MVP mode, the CPMV of the current block may be derived based on a control point motion vector predictor (CPMVP) and a control point motion vector difference. In other words, the encoding apparatus may determine the CPMVP for CPMV of the current block, derive the CPMVD which is a difference value between the CPMV and the CPMVP of the current block, and signal information on the CPMVP and information on the CPMVD to the decoding apparatus. Here, the affine MVP mode may construct the affine MVP candidate list based on a neighboring block, and the affine MVP candidate list may be referred to as a CPMVP candidate list. In addition, the information on the CPMVP may include an index indicating a block or motion vector to be referred from among the affine MVP candidate list.

Referring to FIG. 7, the motion vector of the control point at the top-left sample position of the current block may be represented as $v_0$, the motion vector of the control point at the top-right sample position may be represented as $v_1$, the motion vector of the control point at the bottom-left sample position may be represented as $v_2$, and the motion vector of the control point at the bottom-right sample position may be represented as $v_3$.

For example, if two control points are used in the affine mode and the two control points are located at the top-left sample position and the top-right sample position, the motion vector of a sample unit or subblock unit may be derived based on the motion vectors $v_0$ and $v_1$.

The motion vector $v_0$ may be derived based on at least one motion vector of neighboring blocks A, B, and C of the top-left sample position. Here, the neighboring block A may represent a block located top left of the top-left sample position of the current block, the neighboring block B may represent a block located top of the top-left sample position of the current block, and the neighboring block C may represent a block located left of the top-left sample position of the current block.

The motion vector $v_1$ may be derived based on at least one motion vector of neighboring blocks D and E of the top-right sample position. Here, the neighboring block D may represent a block located top of the top-right sample position of the current block, and the neighboring block E may represent a block located top right of the top-right sample position of the current block.

For example, if three control points are used in the affine mode and the three control points are located at the top-left sample position, the top-right sample position, and the bottom-left sample position, the motion vector of a sample unit or subblock unit may be derived based on the motion vectors $v_0$, $v_1$ and $v_2$. In other words, the motion vector $v_2$ may be further used.

The motion vector $v_2$ may be derived based on at least one motion vector of neighboring blocks F and G of the bottom-left sample position. Here, the neighboring block F may represent a block located left of the bottom-left sample position of the current block, and the neighboring block G may represent a block located bottom left of the bottom-left sample position of the current block.

The affine MVP mode may derive the CPMVP candidate list based on the neighboring blocks, and select the CPMVP pair with the highest correlation among the CPMVP candidate list as the CPMV of the current block. The information on the CPMVP described above may include an index indicating a CPMVP pair selected from among the CPMVP candidate list.

Figure 8:
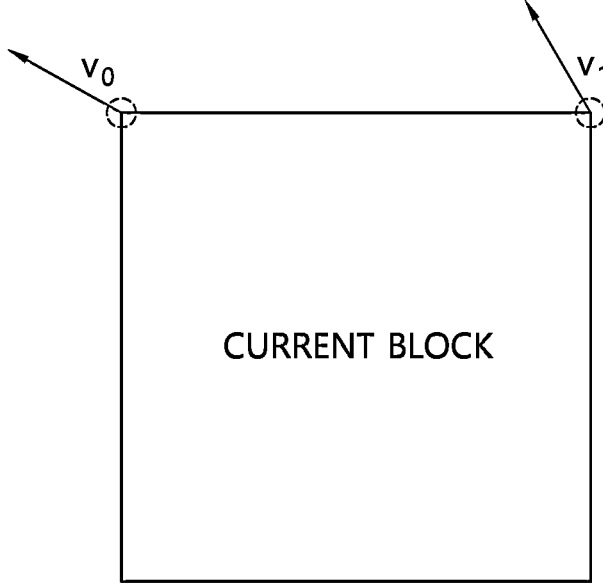
FIG. 8 illustratively represents two CPs for a 4-parameter affine motion model according to an embodiment of the present disclosure.

FIG. 8 illustratively represents two CPs for a 4-parameter affine motion model according to an embodiment of the present disclosure.

An embodiment of the present disclosure may use two CPs. The two CPs may be respectively located at a top-left sample position and a top-right sample position of the current block. Here, a CP located at the top-left sample position may be represented as a $CP_0$ and a CP located at the top-right sample position may be represented as a $CP_1$, and a motion vector at the $CP_0$ may be represented as an m $v_0$ and a motion vector at the $CP_1$ may be represented as an m $v_1$. The coordinates ($CP_i$) of each control point may be defined as $(x_i, y_i)$, $_{i=0, 1}$, and the motion vector at each control point may be represented as $mvi=(v_{xi}, v_{yi})$, $_{i=0, 1}$.

In an embodiment of the present disclosure, a CP located at the top-left sample position may be represented as the $CP_1$ and a CP located at the top-right sample position may be represented as the $CP_0$. In this case, the following process may be similarly performed under the consideration of the switched positions of the $CP_0$ and $CP_1$.

For example, if the width of the current block is W and the height thereof is H, assuming that the coordinates of the bottom-left sample position of the current block are (0, 0), then the coordinates of the $CP_0$ may be represented as (0, H) and the coordinates of the $CP_1$ may be represented as (W, H). Here, W and H may have different values, but may have the same value, and the reference (0, 0) may be set differently.

As shown in FIG. 8, since the affine motion model using two motion vectors according to two CPs in the affine motion prediction method uses four parameters according to two motion vectors, it may be referred to as a 4-parameter affine motion model or a simplified affine motion model.

In an embodiment of the present disclosure, the motion vector of a sample unit may be determined by an affine motion vector field (affine MVF) and position and of a sample. The affine motion vector field may represent a motion vector of a sample unit based on two motion vectors according to two CPs. In other words, the affine motion vector field may derive the motion vector ($v_x$, vy) of the corresponding sample when the sample position is (x, y) as shown in Equation 1.

$$\begin{cases} v_x(x, y) = \dfrac{(v_{1x} - v_{0x})}{w} * x - \dfrac{(v_{1y} - v_{0y})}{w} * y + v_{0x} \\ v_y(x, y) = \dfrac{(v_{1y} - v_{0y})}{w} * x + \dfrac{(v_{1x} - v_{0x})}{w} * y + v_{0y} \end{cases} \quad \text{[Equation 1]}$$

In Equation 1, $v_0x$ and $v_0y$ may mean the (x, y) coordinate components of the motion vector m $v_0$ at the $CP_0$, and $v_1x$ and $v_1y$ may mean the (x, y) coordinate components of the motion vector m $v_1$ at the $CP_1$. Also, w may mean the width of the current block.

Meanwhile, Equation 1 representing the affine motion model is only an example, and the equation for representing the affine motion model is not limited to Equation 1. For example, the sign of each coefficient disclosed in Equation 1 may be changed from that of Equation 1 in some cases.

In other words, according to an embodiment of the present disclosure, a reference block among temporal and/or spatial neighboring blocks from the current block may be determined, a motion vector of the reference block may be used as a motion vector predictor of the current block, and the motion vector of the current block may be expressed with the motion vector predictor and the motion vector difference. In addition, an embodiment of the present disclosure may signal an index for the motion vector predictor and the motion vector difference.

According to an embodiment of the present disclosure, two motion vector differences according to two CPs may be derived based on two motion vectors according to two CPs and two motion vector predictors according to two CPs when encoding, and two motion vectors according to two CPs may be derived based on two motion vector predictors according to two CPs and two motion vector differences according to two CPs when decoding. In other words, the motion vector at each CP may be composed of the sum of the motion vector predictor and the motion vector difference as shown in Equation 2, and may be similar to when using the motion vector prediction (MVP) mode or the advanced motion vector prediction (AMVP) mode.

$$\begin{cases} mv_0 = mvp_0 + mvd_0 \\ mv_1 = mvp_1 + mvd_1 \end{cases} \quad \text{[Equation 2]}$$

In Equation 2, $mvp_0$ and $mvp_1$ may represent a motion vector predictor (MVP) at each of the $CP_0$ and $CP_1$, and $mvd_0$ and $mvd_1$ may represent a motion vector difference (MVD) at each of the $CP_0$ and $CP_1$. Here, mvp may be referred to as CPMVP and mvd may be referred to as CPMVD.

Accordingly, the inter prediction method according to an affine mode according to an embodiment of the present disclosure may code and decode an index and a motion vector difference ($mvd_0$ and $mvd_1$) at each CP. In other words, according to an embodiment of the present disclosure, motion vectors at $CP_0$ and $CP_1$ may be drived based on $mvd_0$ and $mvd_1$ at each of $CP_0$ and $CP_1$ of the current block and $mvp_0$ and $mvp_1$ according to the index, and Inter prediction may be performed by deriving a motion vector of a sample unit based on the motion vector at $CP_0$ and $CP_1$.

The inter prediction method according to the affine mode according to another embodiment of the present disclosure may use one of the motion vector differences according to two CPs, and a difference of two MVDs (DMVD). In other words, in another embodiment, when $mvd_0$ and $mvd_1$ according to $CP_0$ and $CP_1$ exist, inter prediction may be performed by coding and decoding one of $mvd_0$ and $mvd_1$, a difference between $mvd_0$ and $mvd_1$, and an index at each CP. More specifically, in another embodiment of the present disclosure, $mvd_0$ and DMVD ($mvd_0$-$mvd_1$) may be signaled, and $mvd_1$ and DMVD ($mvd_0$-$mvd_1$) may be signaled.

That is, in another embodiment of the present disclosure, motion vector differences ($mvd_0$ and $mvd_1$) at $CP_0$ and $CP_1$ may be derived, respectively, based on the motion vector difference ($mvd_0$ or $mvd_1$) at $CP_0$ or $CP_1$ and a difference of motion vector differences ($mvd_0$ and $mvd_1$) of $CP_0$ and $CP_1$, and motion vectors at $CP_0$ and $CP_1$ may be derived, respectively, based on motion vector predictors ($mvp_0$ and $mvp_1$) at $CP_0$ and $CP_1$ indicated by the index along with such motion vector differences, and inter prediction may be performed by deriving a motion vector of a sample unit based on the motion vectors at $CP_0$ and $CP_1$.

Here, the data on the difference of the two motion vector differences (DMVD) is closer to the zero motion vector (zero MV) than the data on the normal motion vector difference, it is possible to perform the coding more efficiently than in a case according to other embodiments of the present disclosure.

Figure 9:
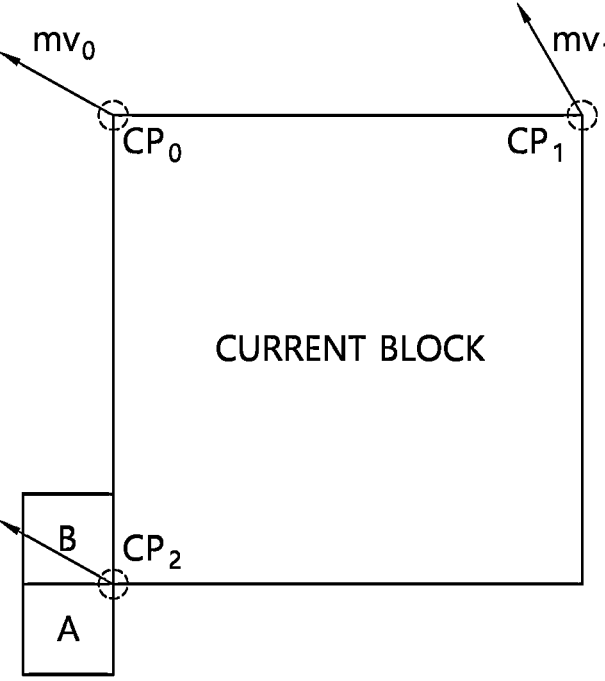
FIG. 9 illustratively represents a case where a median value is additionally used in a 4-parameter affine motion model according to an embodiment of the present disclosure.

FIG. 9 illustratively represents a case where a median value is additionally used in a 4-parameter affine motion model according to an embodiment of the present disclosure.

In the inter prediction according to an affine mode according to an embodiment of the present disclosure, adaptive motion vector coding may be performed using a median predictor of a motion vector predictor.

Referring to FIG. 9, according to an embodiment of the present disclosure, two CPs may be used, and information on CPs of different locations may be derived based on the two CPs. Here, the information related to the two CPs may be the same as the two CPs of FIG. 8. In addition, a CP of another location derived based on the two CPs may be referred to as a $CP_2$, and may be located at a bottom-left sample position of the current block.

Information on the CP of another location may include a motion vector predictor ($mvp_2$) of $CP_2$, and the $mvp_2$ may be derived in two ways.

One method of deriving the $mvp_2$ is as follows. The $mvp_2$ may be derived based on the motion vector predictor $mvp_0$ of $CP_0$ and the motion vector predictor $mvp_1$ of $CP_1$, and may be derived as shown in Equation 3.

$$\begin{cases} mvp_{2x} = mvp_{0x} - h * \dfrac{(mvp_{1y} - mvp_{0y})}{w} \\ mvp_{2y} = mvp_{0y} + h * \dfrac{(mvp_{1x} - mvp_{0x})}{w} \end{cases} \quad \text{[Equation 3]}$$

In Equation 3, $mvp_{0x}$ and $mvp_{0y}$ may mean (x, y) coordinate components of the motion vector predictor ($mvp_0$) at $CP_0$, $mvp_{1x}$ and $mvp_{1y}$ may mean the (x, y) coordinate components of the motion vector predictor ($mvp_1$) at $CP_1$, and $mvp_{2x}$ and $mvp_{2y}$ may mean (x, y) coordinate components of the motion vector predictor ($mvp_2$) at $CP_2$. In addition, h may represent the height of the current block and w may represent the width of the current block.

Another method of deriving the $mvp_2$ is as follows. The $mvp_2$ may be derived based on the neighboring blocks of $CP_2$. Referring to FIG. 9, $CP_2$ may be located at a bottom-left sample position of the current block, and $mvp_2$ may be derived based on a neighboring block A or a neighboring block B of $CP_2$. More specifically, $mvp_2$ may be selected as one of a motion vector of a neighboring block A and a motion vector of a neighboring block B.

In an embodiment of the present disclosure, $mvp_2$ may be derived, and a median value may be derived based on $mvp_0$, $mvp_1$, and $mvp_2$. Here, the median value may mean a value located at the center in order of magnitude among a plurality of values. Therefore, the median value may be selected as one from $mvp_0$, $mvp_1$, and $mvp_2$.

According to an embodiment of the present disclosure, when a median value is equal to $mvp_0$, a motion vector difference ($mvd_0$) of $CP_0$ and a DMVD ($mvd_0$-$mvd_1$) may be signaled for inter prediction, and when the median value is equal to $mvp_1$, the motion vector difference ($mvd_1$) of $CP_1$ and DMVD ($mvd_0$-$mvd_1$) may be signaled for inter prediction. When the median value is equal to $mvp_2$, any one of the case where the median value is equal to $mvp_0$ and the case where the median value is equal to $mvp_1$ may be followed, and this may be predefined.

Here, the above-described process may be performed for each of the x and y components of the motion vector predictor. In other words, the median value may be derived for the x component and the y component, respectively. In this case, when the x component of the median value is the same as the x component of $mvp_0$, only the x component of the motion vector may be coded and decoded according to the above-described case where the median value is equal to $mvp_0$, and when the y component of the median value is the same as the y component of $mvp_1$, only the y component of the motion vector may be coded and decoded according to the above-described case where the median value is the same as $mvp_1$. If the x component and/or y component of the median value is/are equal to the x component and/or y component of $mvp_2$, the x component and/or the y component of the motion vector may be coded and decoded according to any one of the above-described case where the median value is equal to $mvp_0$ and the above-described case where the median value is equal to $mvp_1$, which may be predefined.

Figure 10:
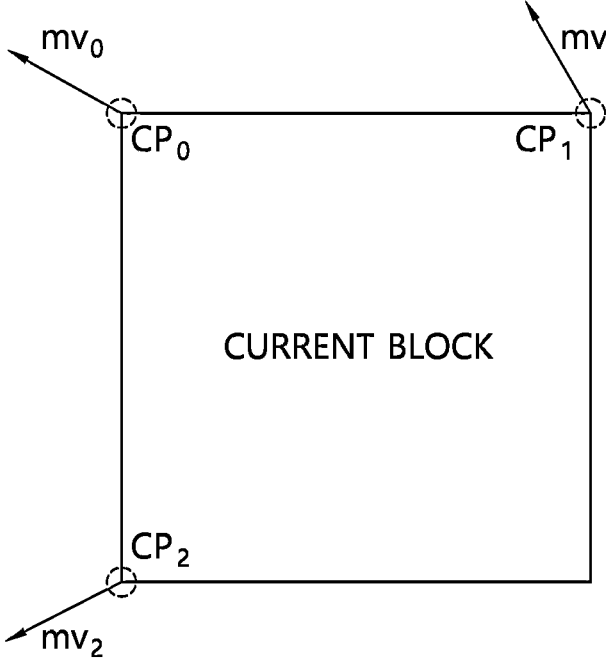
FIG. 10 illustratively represents three CPs for a 6-parameter affine motion model according to an embodiment of the present disclosure.

FIG. 10 illustratively represents three CPs for a 6-parameter affine motion model according to an embodiment of the present disclosure.

An embodiment of the present disclosure may use three CPs. The three CPs may be positioned at a top-left sample position, a top-right sample position, and a bottom-left sample position of the current block, respectively. Here, a CP located at the top-left sample position may be represented as a $CP_0$, a CP located at the top-right sample position may be represented as a $CP_1$, and a CP located at the bottom-left sample position may be represented as a $CP_2$, and a motion vector at the $CP_0$ may be represented as an $mv_0$, a motion vector at the $CP_1$ may be represented as an $mv_1$, and a motion vector at the $CP_2$ may be represented as an $mv_2$. The coordinates ($CPi$) of each control point may be defined as ($x_i$, $y_i$), $_{i=0, 1, 2}$, and the motion vector at each control point may be represented as $mv_i$=($v_{xi}$, $v_{yi}$), $_{i=0, 1, 2}$.

In an embodiment of the present disclosure, three CPs may be distributed at the top-left sample position, the top-right sample position, and the bottom-left sample position, respectively, but the three CPs may be positioned differently from this. For example, $CP_0$ may be located at the top-right sample position, $CP_1$ may be located at the top-left sample position, and $CP_2$ may be located at the bottom-left sample position, but their locations are not limited to this. In this case, the following process may be similarly performed under the consideration of the location of each CP.

For example, if the width of the current block is W and the height thereof is H, assuming that the coordinates of the bottom-left sample position of the current block are (0, 0), then the coordinates of the $CP_0$ may be represented as (0, H), the coordinates of the $CP_1$ may be represented as (W, H), and the coordinates of the $CP_2$ may be represented as (0, 0).

Here, W and H may have different values, but may have the same value, and the reference (0, 0) may be set differently.

As shown in FIG. 10, since the affine motion model using three motion vectors according to three CPs in the affine motion prediction method uses six parameters according to three motion vectors, it may be referred to as a 6-parameter affine motion model.

In an embodiment of the present disclosure, the motion vector of a sample unit may be determined by an affine motion vector field (affine MVF) and position and of a sample. The affine motion vector field may represent a motion vector of a sample unit based on three motion vectors according to three CPs.

According to an embodiment of the present disclosure, a reference block among temporal and/or spatial neighboring blocks from the current block may be determined, and a motion vector of the reference block may be used as a motion vector predictor of the current block, and the motion vector of the current block may be represented with the motion vector predictor and the motion vector difference. In addition, an embodiment of the present disclosure may signal an index for the motion vector predictor and the motion vector difference.

According to an embodiment of the present disclosure, three motion vector differences according to three CPs may be derived based on three motion vectors according to three CPs and three motion vector predictors according to three CPs when encoding, and three motion vectors according to three CPs may be derived based on three motion vector predictors according to three CPs and three motion vector differences according to three CPs when decoding. In other words, the motion vector at each CP may be composed of the sum of the motion vector predictor and the motion vector difference as shown in Equation 4.

$$\begin{cases} mv_0 = mvp_0 + mvd_0 \\ mv_1 = mvp_1 + mvd_1 \\ mv_2 = mvp_2 + mvd_2 \end{cases} \qquad \text{[Equation 4]}$$

In Equation 4, $mvp_0$, $mvp_1$ and $mvp_2$ may represent a motion vector predictor (MVP) at each of the $CP_0$, $CP_1$ and $CP_2$, and $mvd_0$, $mvd_1$ and $mvd_2$ may represent a motion vector difference (MVD) at each of the $CP_0$, $CP_1$ and $CP_2$. Here, mvp may be referred to as CPMVP and mvd may be referred to as CPMVD.

Accordingly, the inter prediction method according to an affine mode according to an embodiment of the present disclosure may code and decode index and motion vector differences ($mvd_0$, $mvd_1$, and $mvd_2$) at each CP. In other words, according to an embodiment of the present disclosure, motion vectors at $CP_0$, $CP_1$, and $CP_2$ may be derived based on $mvd_0$, $mvd_1$ and $mvd_2$ at each of $CP_0$, $CP_1$, and $CP_2$ of the current block and $mvp_0$, $mvp_1$, and $mvp_2$ according to the index, and inter prediction may be performed by deriving a motion vector of a sample unit based on the motion vectors at $CP_0$, $CP_1$, and $CP_2$.

The affine motion prediction method according to another embodiment of the present disclosure may use one motion vector difference of three motion vector differences, a difference of the one motion vector difference and another motion vector difference (DMVD, Difference of two MVDs), and a difference of the one motion vector difference and further another motion vector difference (DMVD).

More specifically, in another embodiment of the present disclosure, when $mvd_0$, $mvd_1$ and $mvd_2$ are derived according to three CPs, inter prediction may be performed by signaling $mvd_0$ and two DMVDs ($mvd_0$-$mvd_1$, and $mvd_0$-$mvd_2$), by signaling $mvd_1$ and two DMVDs ($mvd_0$-$mvd_1$, and $mvd_1$-$mvd_2$), or by signaling $mvd_2$ and two DMVDs ($mvd_0$-$mvd_2$, and $mvd_1$-$mvd_2$). Here, for convenience, one DMVD of the two DMVD may be referred to as a first DMVD ($DMVD_1$) and the other DMVD may be referred to as a second DMVD ($DMVD_2$). In addition, when coding and decoding $mvd_0$ and two DMVDs ($mvd_0$-$mvd_1$ and $mvd_0$-$mvd_2$), $mvd_0$ may be referred to as the MVD for $CP_0$, DMVD ($mvd_0$-$mvd_1$) may be referred to as the DMVD for $CP_1$, and DMVD ($mvd_0$-$mvd_2$) may be referred to as the DMVD for $CP_2$.

That is, according to another embodiment of the present disclosure, three mvds (e.g., $mvd_0$, $mvd_1$ and $mvd_2$) may be derived based on one mvd and two DMVDs, and a motion vector at each of the three CPs may be derived based on a motion vector predictor according to an index for three CPs (e.g., $CP_0$, $CP_1$ and $CP_2$) and along with such mvds, and inter prediction may be performed by deriving a motion vector of a sample unit based on motion vectors at three CPs.

In another embodiment of the present disclosure described with reference to FIG. 10, the method using a median predictor described with reference to FIG. 9 may be adaptively applied to efficiently perform motion vector coding, and in this case, the process of deriving $mvp_2$ may be omitted from the method described with reference to FIG. 9.

Hereinafter, in the description of the present disclosure, $CP_0$, $CP_1$, and $CP_2$ may be represented as a first CP, a second CP, and a third CP, respectively, and the motion vector (MV), the motion vector predictor (MVP), and the motion vector difference (MVD) according to each CP may also be represented in the similar way as the above.

Figure 11:
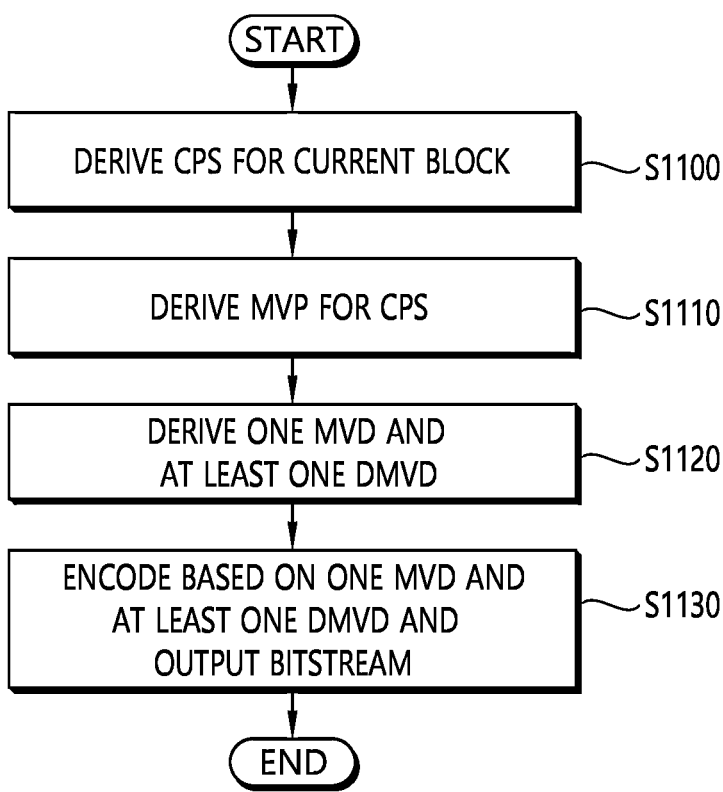
FIG. 11 schematically represents a video encoding method by an encoding device according to the present disclosure.

FIG. 11 schematically represents a video encoding method by an encoding device according to the present disclosure.

The method disclosed in FIG. 11 may be performed by the encoding device disclosed in FIG. 1. For example, S1100 to S1120 in FIG. 11 may be performed by the predictor of the encoding apparatus; and S1130 may be performed by the entropy encoder of the encoding apparatus.

The encoding apparatus derives control points (CP) for the current block (S1100). When affine motion prediction is applied to the current block, the encoding apparatus may derive CPs, and the number of CPs may be two or three depending on an embodiment.

For example, when there are two CPs, the CPs may be located at the top-left sample position and the top-right sample position of the current block, respectively, and if the height and width of the current block are H and W, respectively, and the coordinate component of the bottom-left sample position is (0, 0), then the coordinate components of the CPs may be (0, H) and (W, H), respectively.

For example, when there are three CPs, the CPs may be located at the top-left sample position, the top-right sample position, and the bottom-left sample position of the current block, respectively, and if the height and width of the current block are H and W, respectively, and the coordinate component of the bottom-left sample position is (0, 0), then the coordinate components of the CPs may be (0, H), (W, H), and (0, 0), respectively.

The encoding apparatus derives MVP for CPs (S1110). For example, when the number of the derived CPs are two, the encoding apparatus may obtain two motion vectors. For example, when the number of the derived CPs are three, the encoding apparatus may obtain three motion vectors. The MVP for the CP may be derived based on the neighboring blocks, and a detailed description thereof has been described above with reference to FIGS. 7 and 9.

For example, when the first CP and the second CP are derived, the encoding apparatus may derive the first MVP for the first CP and the second MVP for the second CP based on neighboring blocks of the current block, and when a third CP is further derived, the encoding apparatus may further derive the third MVP based on neighboring blocks of the current block.

For example, when the first CP, the second CP, and the third CP are derived, the encoding apparatus may derive the third MVP for the third CP based on the first MVP for the first CP and the second MVP for the second CP, and derive the third MVP based on a motion vector of a neighboring block of the third CP.

The encoding apparatus derives one motion vector difference (MVD) and at least one difference of two MVDs (DMVD) (S1120). The motion vector difference (MVD) may be derived based on the motion vector (MV) and the motion vector predictor (MVP), and for this purpose, the encoding apparatus may also derive the motion vector of each CP. The difference of motion vector differences (DMVD) may be derived based on a plurality of motion vector differences.

For example, when there are two CPs, the encoding apparatus may derive one MVD and one DMVD. The encoding apparatus may derive two MVDs from motion vectors of two CPs and two MVPs. In addition, one of the two MVDs to be coded may be selected, and a difference of the two MVDs (DMVD) may be derived based on the selected one.

For example, when the first CP and the second CP are derived, the encoding apparatus may derive the first MVD for the first CP and the DMVD for the second CP. Here, the DMVD for the second CP may represent a difference between the first MVD and the second MVD for the second CP, and the first MVD may be a reference.

For example, when there are three CPs, the encoding apparatus may derive one MVD and two DMVDs. The encoding apparatus may derive three MVDs from three MVPs according to a motion vector of three CPs and a reference block, and from among the three MVDs, any one MVD to be coded can be selected. In addition, the encoding apparatus may derive a difference between the selected one MVD and another MVD ($DMVD_1$) and a difference between the selected one MVD and further another MVD ($DMVD_2$).

For example, when the third CP is further derived, the encoding apparatus may derive the first MVD for the first CP, the DMVD for the second CP, and the DMVD for the third CP. Here, the DMVD for the second CP may represent a difference between the first MVD and the second MVD for the second CP, and the DMVD for the third CP may represent a difference between the first MVD and the third MVD for the third CP, and the first MVD may be a reference.

For example, when a third CP is further derived, the encoding apparatus may derive a median value based on the first MVP, the second MVP, and the third MVP, and in this case, the third MVD and the DMVD for the third CP may not be derived. A detailed description thereof has been described above with reference to FIG. 9.

The encoding apparatus encodes based on one MVD and at least one DMVD and outputs a bitstream (S1130). For inter prediction, the encoding apparatus may generate and output a bitstream for a current block including one MVD, at least one DMVD, and an index for a motion vector predictor.

For example, when there are two CPs, the encoding apparatus may generate a bitstream for the current block including an index for a motion vector predictor of two CPs and a motion vector difference for any one of two CPs, and a difference of motion vector differences for two CPs.

For example, when the first CP and the second CP are derived, the encoding apparatus may output a bitstream by encoding image information including information on the first MVD and information on the DMVD for the second CP.

For example, if there are three CPs, the encoding apparatus may generate a bitstream for the current block including an index for motion vector predictors of three CPs and motion vector difference for one of three CPs, a difference between the motion vector difference for the one CP and the motion vector difference for another CP, and a difference between a motion vector difference for the one CP and a motion vector difference for further another CP.

For example, when a third CP is further derived, the encoding apparatus may further include information on DMVD for the third CP in the image information, and may encode the image information to output a bitstream.

For example, when a third CP is further derived and a median value is derived, then the encoding apparatus may output a bitstream by encoding image information including information on the first MVD and information on the DMVD for the second CP, and may not further include information on the DMVD for the third CP in the image information.

The bitstream generated and output by the encoding apparatus may be transmitted to the decoding apparatus through a network or a storage medium.

Figure 12:
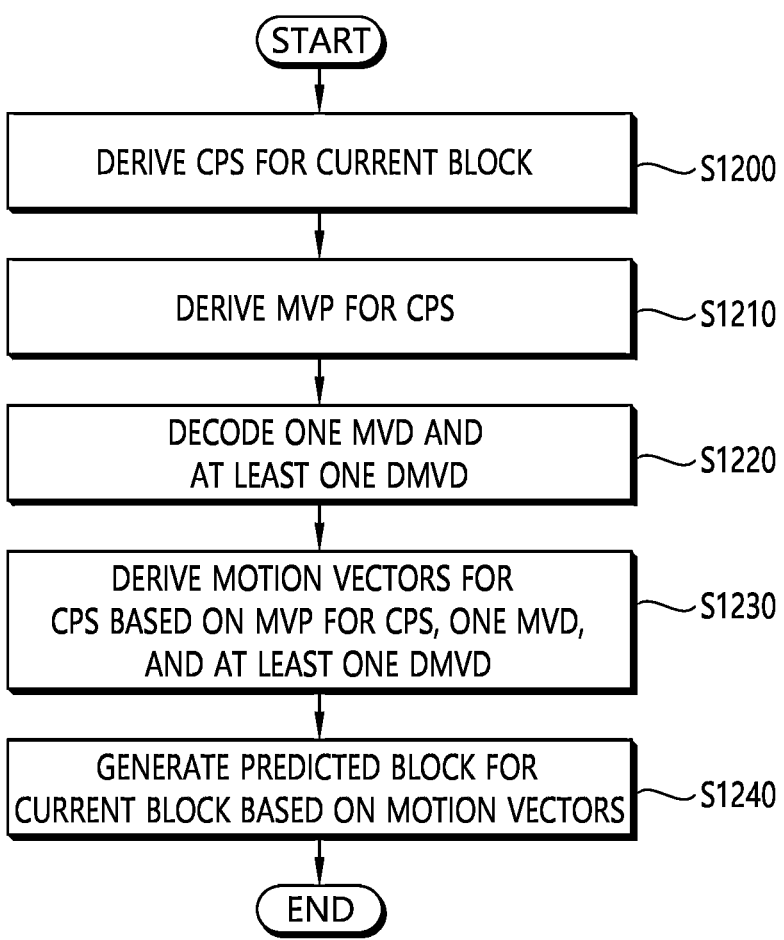
FIG. 12 schematically illustrates an inter-prediction method by a decoding apparatus according to the present disclosure.

FIG. 12 schematically illustrates an inter-prediction method by a decoding apparatus according to the present disclosure.

The method disclosed in FIG. 12 may be performed by the decoding apparatus disclosed in FIG. 2. For example, S1200, S1210, S1230, and S1240 in FIG. 12 may be performed by the predictor of the decoding apparatus, and S1220 may be performed by the entropy decoder of the decoding apparatus. Here, S1220 may be performed prior to S1200 and S1210.

The decoding apparatus derives control points (CP) for the current block (S1200). When affine motion prediction is applied to the current block, the decoding apparatus may derive CPs, and the number of CPs may be two or three depending on an embodiment.

For example, when there are two CPs, the CPs may be located at the top-left sample position and the top-right sample position of the current block, respectively, and if the height and width of the current block are H and W, respectively, and the coordinate component of the bottom-left sample position is (0, 0), then the coordinate components of the CPs may be (0, H) and (W, H), respectively.

For example, when there are three CPs, the CPs may be located at the top-left sample position, the top-right sample position, and the bottom-left sample position of the current block, respectively, and if the height and width of the current block are H and W, respectively, and the coordinate component of the bottom-left sample position is (0, 0), then the coordinate components of the CPs may be (0, H), (W, H), and (0, 0), respectively.

The decoding apparatus derives MVP for CPs (S1210). For example, when the number of the derived CPs are two, the decoding apparatus may obtain two motion vectors. For example, when the number of the derived CPs are three, the decoding apparatus may obtain three motion vectors. The MVP for the CP may be derived based on the neighboring blocks, and a detailed description thereof has been described above with reference to FIGS. 7 and 9.

For example, when the first CP and the second CP are derived, the decoding apparatus may derive the first MVP for the first CP and the second MVP for the second CP based on neighboring blocks of the current block, and when a third CP is further derived, the decoding apparatus may further derive the third MVP based on neighboring blocks of the current block.

For example, when the first CP, the second CP, and the third CP are derived, the decoding apparatus may derive third MVP for the third CP based on the first MVP for the first CP and the second MVP for the second CP, and derive the third MVP based on a motion vector of a neighboring block of the third CP.

The decoding apparatus decodes one MVD and at least one DMVD (S1220). The decoding apparatus may obtain one MVD and at least one DMVD by decoding one MVD and at least one DMVD based on the received bitstream. Here, the bitstream may include an index for a motion vector predictor of CPs. The bitstream may be received from the encoding apparatus through a network or a storage medium.

For example, when there are two CPs, the decoding apparatus may decode one MVD and one DMVD, and when there are three CPS, the decoding apparatus may decode one MVD and two DMVDs. Here, DMVD may mean a difference between two MVDs.

For example, when the first CP and the second CP are derived, the decoding apparatus may decode the first MVD for the first CP, and decode the DMVD for the second CP. Here, the DMVD for the second CP may represent a difference between the first MVD and the second MVD for the second CP.

For example, when the third CP is further derived, the decoding apparatus may decode the first MVD for the first CP, and decode the DMVD for the second CP and the DMVD for the third CP. Here, the DMVD for the second CP may represent a difference between the first MVD and the second MVD for the second CP, and the DMVD for the third CP may represent a difference between the first MVD and the third MVD for the third CP.

For example, if a third CP is further derived and a median value is used, then the decoding apparatus may decode the first MVD for the first CP, and decode the DMVD for the second CP. Here, the DMVD for the third CP may not be decoded.

The decoding apparatus derives motion vectors for CPs based on MVP for CPs, one MVD, and at least one DMVD (S1230). The motion vectors for CPs may be derived based on the motion vector difference (MVD) and the motion vector predictor (MVP), and the motion vector difference may be derived based on the difference between the motion vector differences (DMVD).

For example, when there are two CPs, the decoding apparatus may receive one MVD and one DMVD, and based on them, may derive two MVDs according to the two CPs. The decoding apparatus may receive indexes for two CPs together, and based on them, may derive two MVPs. The decoding apparatus may derive respectively motion vectors for two CPs based on two MVDs and two MVPs.

For example, when the first CP and the second CP are derived, the decoding apparatus may derive the first MV based on the first MVD and the first MVP, the second MVD for the second CP based on the first MVD and the DMVD for the second CP, and the second MV based on the second MVD and the second MVP.

For example, when there are three CPs, the decoding apparatus may receive one MVD and two DMVD, and based on them, may derive three MVDs according to the three CPs. The decoding apparatus may receive indexes for three CPs together, and based on them, may derive three MVPs. The decoding apparatus may derive respectively motion vectors for three CPs based on three MVDs and three MVPs.

For example, if the third CP is further derived and the third MVP is derived, the decoding apparatus may derive the third MVD for the third CP based on the first MVD and the DMVD for the third CP, and derive the third MV based on the third MVD and the third MVP.

For example, if the third CP is further derived and the median value is the same as the first MVP, then the decoding apparatus may derive the first MV based on the first MVD and the first MVP, the second MVD for the second CP based on the first MVD and the DMVD for the second CP, and the second MV based on the second MVD and the second MVP.

For example, if the third CP is further derived and the median value is the same as the second MVP, then the decoding apparatus may derive the second MV based on the second MVD and the second MVP, derive the first MVD for the first CP based on the second MVD and the DMVD for the first CP, and derive the first MV based on the first MVD and the first MVP.

For example, if the third CP is further derived and the median value is the same as the third MVP, then the decoding apparatus may derive the first MV and the second MV according to any one of a case where the median value is the same as the first MVP and a case where the median value is the same as the second MVP. Determining any one of the case where the median value is the same as the first MVP and the case where the median value is the same as the second MVP may be predefined. A detailed description thereof has been described above with reference to FIG. 9.

The decoding apparatus generates a predicted block for the current block based on the motion vectors (S1240). The decoding apparatus may derive an affine motion vector field (affine MVF) based on motion vectors of respective CPs, and based on them, may derive a motion vector of a sample unit to perform inter prediction.

In the above-described embodiments, the methods are explained based on flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device.

What is claimed is:

1. An image decoding method performed by a decoding apparatus, the method comprising:

obtaining residual information from a bitstream;

deriving a first motion vector predictor (MVP) for a first control point (CP), a second MVP for a second CP and a third MVP for a third CP of a current block based on neighboring blocks of the current block, wherein the first CP is located at a top-left position of the current block, the second CP is located at a top-right position of the current block, and the third CP is located at a bottom-left position of the current block;

decoding information on a first motion vector difference (MVD) for the first CP to derive the first MVD;

decoding information on a difference of two MVDs (DMVD) for the second CP, which is a difference between a second MVD for the second CP and the first MVD, to derive the DMVD for the second CP;

decoding information on a DMVD for the third CP, which is a difference between a third MVD for the third CP and the first MVD, to derive the DMVD for the third CP;

deriving a first motion vector (MV) for the first CP based on the first MVP and the first MVD;

deriving a second MV for the second CP based on the second MVP and the second MVD;

deriving a third MV for the third CP based on the third MVP and the third MVD;

generating prediction samples for the current block based on the first MV, the second MV and the third MV;

generating residual samples for the current block based on the residual information; and generating reconstructed samples based on the prediction samples and the residual samples, wherein the second MVD is derived based on the first MVD and the DMVD for the second CP, and wherein the third MVD is derived based on the first MVD and the DMVD for the third CP.

2. An image encoding method performed by an encoding apparatus, the method comprising:

deriving a first motion vector predictor (MVP) for a first control point (CP), a second MVP for a second CP and a third MVP for a third CP of a current block based on neighboring blocks of the current block, wherein the first CP is located at a top-left position of the current block, the second CP is located at a top-right position of the current block, and the third CP is located at a bottom-left position of the current block;

deriving a first motion vector difference (MVD) for the first CP;

deriving a difference of two MVDs (DMVD) for the second CP based on a second MVD for the second CP and the first MVD;

deriving a DMVD for the third CP based on a third MVD for the third CP and the first MVD;

generating prediction samples for the current block based on a first motion vector (MV), a second MV and a third MV;

generating residual samples of the current block based on the prediction samples, and encoding image information including information on the first MVD, information on the DMVD for the second CP, information on the DMVD for the third CP, and residual information related to the residual samples to output a bitstream, wherein the second MVD is derived based on the second MV for the second CP and the second MVP for the second CP, and wherein the third MVD is derived based on the third MV for the third CP and the third MVP for the third CP.

3. A non-transitory computer readable storage medium storing the bitstream generated by the image encoding method of the claim 2.

4. A transmission method of data for an image, the method comprising:

obtaining a bitstream for the image, wherein the bitstream is generated based on deriving a first motion vector predictor (MVP) for a first control point (CP), a second MVP for a second CP and a third MVP for a third CP of a current block based on neighboring blocks of the current block, wherein the first CP is located at a top-left position of the current block, the second CP is located at a top-right position of the current block, and the third CP is located at a bottom-left position of the current block, deriving a first motion vector difference (MVD) for the first CP, deriving a difference of two MVDs (DMVD) for the second CP based on a second MVD for the second CP and the first MVD, deriving a DMVD for the third CP based on a third MVD for the third CP and the first MVD, generating prediction samples for the current block based on a first motion vector (MV), a second MV and a third MV, generating residual samples of the current block based on the prediction samples, and encoding image information including information on the first MVD, information on the DMVD for the second CP, information on the DMVD for the third CP, and residual information related to the residual samples; and transmitting the data comprising the bitstream, wherein the second MVD is derived based on the second MV for the second CP and the second MVP for the second CP, and wherein the third MVD is derived based on the third MV for the third CP and the third MVP for the third CP.

* * * * *